United States Patent [19]

Chiba et al.

[11] Patent Number: 4,970,280
[45] Date of Patent: Nov. 13, 1990

[54] CONTINUOUS PROCESS FOR PRODUCING HIGH MOLTEN VISCOELASTIC POLYPROPYLENE OR ETHYLENE-PROPYLENE COPOLYMER

[75] Inventors: Hiromasa Chiba; Takahiro Oka; Shunji Kawazoe, all of Ichiharashi, Japan

[73] Assignee: Chisso Corporation, Osaka, Japan

[21] Appl. No.: 165,508

[22] Filed: Mar. 8, 1988

[30] Foreign Application Priority Data

Apr. 1, 1987 [JP] Japan .................................. 62-80049
Apr. 8, 1987 [JP] Japan .................................. 62-86268

[51] Int. Cl.$^5$ .......................... C08F 2/14; C08F 10/06
[52] U.S. Cl. .................................. 526/65; 526/68; 526/351; 526/905; 525/53
[58] Field of Search ........................... 526/65, 68

[56] References Cited

U.S. PATENT DOCUMENTS

| | | | |
|---|---|---|---|
| 2,978,441 | 4/1961 | Sherk | 526/68 |
| 4,760,113 | 7/1988 | Chiba et al. | 525/53 |
| 4,771,103 | 9/1988 | Chiba et al. | 525/53 |

FOREIGN PATENT DOCUMENTS

| | | | |
|---|---|---|---|
| 55-123637 | 9/1980 | Japan | 526/351 |
| 57-190006 | 11/1982 | Japan | 526/351 |
| 62-124108 | 6/1987 | Japan | 526/65 |
| 462833 | 7/1975 | U.S.S.R. | 526/65 |

*Primary Examiner*—Edward J. Smith
*Attorney, Agent, or Firm*—Fred Philpitt

[57] ABSTRACT

Continuous processes for producing high melting and viscoelasting polypropylene or ethylene-propylene copolymer are provided.

These processes are characterized by (1) using two or more polymerizers connected in series, (2) supplying the whole amount of a catalyst and a molecular weight regulator (hydrogen) in the first tank and (3) a degasification amount of each tank in the second and subsequent tanks being 0.5 to 10 $V_1$/Hr (wherein $V_1$ is a volume of the tank) calculated at 0° C., and 0 Kg/cm$^2$G. In the process for producing the copolymer, (4) monomers having an ethylene content of 5 wt % or less are supplied in the first step. According to the processes of the present invention, polymers having a broad molecular weight distribution and good fluidity upon extrusion molding can be obtained and operational control in production is simply made.

5 Claims, 2 Drawing Sheets

CONTINUOUS PROCESS FOR PRODUCING HIGH MOLTEN VISCOELASTIC POLYPROPYLENE OR ETHYLENE-PROPYLENE COPOLYMER

BACKGROUND OF THE INVENTION

1. Field of the Invention

The present invention relates to a continuous process for producing high molten viscoelastic polypropylene. More particularly, the present invention relates to the process for producing polypropylene having a wide molecular weight distribution and suited for post-finishing sheets and blow molding which comprises polymerizing propylene at multiple stages using two or more polymerizers connected in series.

The present invention further relates to a continuous process for producing high molten viscoelastic ethylene-propylene copolymers. More particularly, the present invention relates to the process which comprises performing a polymerization step (i) of propylene as a main component in a first to second tanks or a tank(s) subsequent thereto of polymerizers consisting of at least 3 connected in series and performing a polymerization step (ii) in which ethylene is used in a relatively large amount in a third tank or a tank(s) subsequent thereto.

The copolymers obtained by the processes of the present invention have more excellent impact strength than those obtained by known methods and are suited for post-finishing sheets, blow molding and injection molding.

2. Prior Art Statement

Sheets produced by finishing and molding known general-purpose polypropylene involve various defects below. These are such problems that (1) upon molding for secondary finishing, sagging of the sheets is rapid, allowance for finishing conditions is narrow, a molding efficiency is poor, etc.; and in addition, (2) in broad sheets, the aforesaid sagging is serious, a thickness of post-finished articles tends to be non-uniform and wrinkles due to sags laid on one another tend to occur, etc. For these reasons, molded articles of a small size ca only be produced.

On the other hand, in the case of finishing known general-purpose polypropylene by blow molding, the following problems encountered. Namely, (1) due to serious sagging of parison upon molding, a thickness of molded articles become non-uniform. Thus, blow molding is applicable only to molded articles of a small size; (2) when polypropylene having a high molecular weight is used in order to prevent the sagging described above, not only dangers of causing poor fluidity of melt, an increased load upon molding, an increased loss of energy and other mechanical troubles increase but chalk mark of actually molded articles is remarkable and their commercial value is lost.

In order to improve the aforesaid sheet formability and blow formability in accordance with the use of polypropylene, low density polyethylene, etc. is incorporated in polypropylene, for example, in Published Examined Japanese Patent Application No. 80614/72 and Published Unexamined Japanese Patent Application No. 8848/75. However, articles molded from such a mixture tend to cause chalk marks; in order to prevent the chalk marks, intensive kneading is required upon melting and in this case, the practice of these inventions is restricted in view of selecting a kneader and power consumption. In addition, the products obtained in accordance with the inventions also involve a problem of decrease in rigidity. Further Published Unexamined Japanese Patent Application Nos. 91954/78, 185336/82, 187337/82,. 7439/83, etc. propose methods for kneading polypropylenes having different molecular weights using a granulator. However, articles molded from mixtures in accordance with these inventions tend to cause chalk marks more seriously than those from the mixture of low density polyethylene described above and, the practice of these inventions is restricted from aspects of the kneading process and choice of difference in molecular weight.

In order to dissolve the foregoing problems involved in the formability of general-purpose polypropylene, many proposals have been made also on a method for broadening a molecular weight distribution of the product by multiple polymerization, for example, in Published Unexamined Japanese Patent Application Nos. 185304/82, 190006/82, 7405/83, 7409/83, 172507/84, etc. According to examples of these inventions, polypropylene having different molecular weights is formed at multiple steps by batch polymerization in most of them; however, the batch polymerization encounters a defect that productivity per a unit facility is low as a commercial process, because this method makes so called idle time such as charging raw materials, withdrawing products, etc.

Further in the inventions of Published Unexamined Japanese Patent Application No. 185304/82 and described thereafter, continuous polymerization is also mentioned to the effect that (a) when the order of stagewise production is in accordance with the combination of high molecular weight articles to low molecular weight articles, a necessary difference in molecular weight can be achieved merely by adding hydrogen at a later stage of multiple polymerization so that such is preferred as a process but conversely, (b) when the order is in accordance with the combination of low molecular weight articles to high molecular weight articles, unnecessary hydrogen must be removed from a tank in which a polymerization mixture is retained, by lowering the pressure or deaeration, etc. prior to production of high molecular weight articles and therefore, (b) is inferior in processability to (a) described above.

However, according to duplication and investigations of the present inventor, in the case of production through the order of high molecular weight articles to low molecular weight articles mentioned to be preferred in the prior art supra, a problem encounters that a melt flow rate (hereafter referred to as MFR) of the high molecular weight portion can be measured only with difficulty or it is impossible when MFR is low, resulting in an obstacle for controlling operation (note: it is possible to measure viscosity $[\eta]$ but much time is required for the measurement so that this is not a practical method as a means for control of operation).

Furthermore, the polypropylene produced in multiple steps in the order of high molecular weight to low molecular weight results in an abnormally large difference between MFR value of the powders prior t granulation and that of pellets obtained by granulation (note: MFR value of the powders is low) and, it has been noted that there are problems in controlling the difference in molecular weight at each step as the multiple polymerization and in controlling MFR values of the products.

On the other hand, crystalline polypropylene involves a problem that impact strength, in particular, impact strength at low temperatures is low, while it has excellent physical properties in rigidity, heat resistance, etc. From this aspect, area of practical use has been limited. In order to improve the defect, many proposals have been made on a process for block copolymerizing ethylene or other α-olefins. These many proposals have been made in, for example, Published Unexamined Japanese Patent Application Nos. 142652/75, 8094/77, 34112/82 etc. In these proposals, however, after polymerization 1 of propylene as the major component is performed, hydrogen is removed and polymerization 2 of monomers containing ethylene in a relatively large amount is performed, whereby some measures are elaborated to broaden the molecular weight distribution.

In general, in the case of adopting multiple continuous polymerization in block copolymerization, some distribution (note: it is considered to be close to a full mixing tank distribution) in residence time of each catalyst particle in each step so that the product becomes an aggregate of polymer particles in which proportions of the polypropylene content and the polyethylene content (note: a portion containing ethylene in a relatively large amount) vary depending upon time and, based on this heterogeneity, defects generate in quality.

Particularly in the continuous process for producing copolymers of the present invention later described in detail, a molecular weight difference is given in every stage in step (i) of the multiple polymerization of propylene as the major component so that when the prior art technique is adopted as it is, the molecular weight difference in each polymer particle is broadened than in conventional block copolymerization and problems due to heterogeneity could be more remarkable.

Many methods for improving the foregoing problems of the multiple continuous polymerization have also be proposed. For example, in Published Unexamined Japanese Patent Application Nos. 48916/83, 116716/80, 69215/83, etc., there is proposed a method in which a slurry released from a polypropylene polymerization part (polymerization step 1) is classified by cyclone and the finely divided particles are returned to the polypropylene polymerization part. However, classification based on polymer graininess is not necessarily identical with a residence time distribution and the effect is thus insufficient. In Published Unexamined Japanese Patent Application Nos. 195718/82, 29811/83, etc., there are also proposed some methods in which supply of a catalyst to a polymerizer and withdrawal of the slurry from the polymerizer are made intermittently and a part of the catalyst going into a polyethylene polymerization part (polymerization step 2) is reduced while the residence time is short. These methods involve a problem that the polymerization is unstable.

In addition, like embodiment B of the present invention later described, there are also proposed some methods in which the slurry released from the polypropylene polymerization part is treated with an electron donating compound, etc. thereby to selectively inactivate the catalyst particle discharged in a short residence time.

For example, in Published Unexamined Japanese Patent Application Nos. 145115/82 and 115417/80, various electron donating compounds are proposed but the compounds in the range used in the examples are insufficient to achieve the objects of the present invention later described.

Based on the results of various investigations to dissolve the problems described above, the present inventors proposed an invention of Japanese Patent Application No. 283728/85. However, it was troublesome in that the process was somewhat complicated because at least four polymerizers are required, there are limitations to a reaction weight ratio and polymerization conditions in each polymerizer, etc.

As a result of various investigations to solve the technical problems described above, the present inventors noted that when two or more polymerizers were connected in series, a catalyst and hydrogen were fed only in a first tank and propylene was polymerized, the polymerization mixture in the first tank was sequentially transferred in a polymerizer at a later stage and accompanied thereby, the reaction progress, catalyst concentration and hydrogen concentration at later stages were reduced in order so that polymers having a high molecular weight can be produced and polypropylene having a broad molecular weight distribution could be obtained as the final product. Based on this finding, an invention of Japanese Patent Application No. 264593/85 was proposed. In the process described above, however, problems encountered that operation and control were complicated because three or more polymerizers were required, there are limitations to a reaction weight ratio and polymerization conditions in each polymerizer, etc.

SUMMARY OF THE INVENTION

As a result of continuous investigations to solve the problems described above, the present inventor has found that upon polymerization of propylene using two or more polymerizers connected in series by supplying a catalyst and hydrogen only in a first tank, the hydrogen concentration is getting less and less in polymerizers at later stages so that polymers having a higher molecular weight can be produced but further by withdrawing a part of the gas in a gaseous phase, the molecular weight in each polymerizer can be freely controlled on a practical level, without providing facilities such as a degasification tank, etc. in the interphase thereof.

As is evident from the foregoing description, an object in the first process of the present invention is to provide an improved process which is particularly excellent in operability and easy in quality control, in a continuous process for producing high molten viscoelastic polypropylene having good formability due to a broad molecular weight distribution. Another object is to provide high molten viscoelastic polypropylene having excellent formability produced by the process described above.

Further with respect to the second process of the present invention, in view of the problems in the aforesaid techniques of the prior art and earlier filed inventions relative to multiple continuous polymerization, the present inventor has made investigations to develop polymerization improved in these problems. As a result, it has been found that in a process wherein (1) polymerization of propylene as the major component is performed in earlier two or more polymerizers (ethylene content of monomers to be supplied is 0 to 5 wt%), using 3 or more polymerizers connected in series and polymerization of monomers containing ethylene in a relatively large amount is then performed in one or more remaining polymerizers (ethylene content in the monomers to be supplied is 10 to 100 wt%) and (2) wherein a catalyst to be used and hydrogen as a molecular weight regulator are supplied in a first tank by the whole amounts in which the catalyst and hydrogen (except for those consumed on the way) are transferred in order into a second and subsequent tanks, together with the reaction mixture (slurry), the molecular weight of a polymer produced in each polymerizer can be freely controlled on a practical level by continuously withdrawing a gas from a gaseous phase of the polymerizers of the second tank or a tank(s) subsequent thereto, without providing any special facilities such as for degasification, etc. and, the second process of the present invention has been accomplished.

As is evident from the foregoing description, an object of the second process of the present invention is to provide a continuous process for producing high molten viscoelastic ethylene-propylene copolymers which have good physical properties for sheets, blow molding and injection molding and can stably produce ethylene-propylene block copolymers capable of preparing large sized molded articles. Another object is to provide copolymers produced by the process. These and other objects will be apparent from the following description.

The present invention is constructed by (1) or (5) described below, with embodiments (2) to (4) or (6) to (8) described below.

(1) In a process for continuously producing polypropylene by polymerization of propylene using a Ziegler-Natta catalyst by the slurry method or bulk polymerization method, the continuous process for producing high molten viscoelastic polypropylene which comprises:
  (1) using at least two polymerizers connected in series;
  (2) supplying the whole amount of a catalyst used in a first polymerizer, said catalyst being continuously transferred in a second and subsequent polymerizers in order, together with the reaction mixture;
  (3) using hydrogen as a molecular weight regulator and supplying the whole amount of hydrogen used in a first polymerizer, said hydrogen being continuously transferred in a second and subsequent polymerizers in order, together with the reaction mixture;
  (4) producing polymerized polypropylene on the catalyst in each polymerizer in order and then continuously discharging the reaction slurry from the terminal polymerizer; and,
  (5) performing degasification from a gaseous phase in at least one polymerizer of the second and subsequent polymerizers, an amount to be degasified being 0.5 to 10 $V_1$/hr calculated as NTP when a volume of the polymerizer is $V_1$.

(2) The continuous process as described in (1) above wherein a ratio of MFR value of each polymer produced in the first polymerizer and the terminal polymerizer in at least two polymerizers connected in series is adjusted to be in a range of equation [1] below:

$$\log \frac{MFR_1}{MFR_t} \geq 2 \qquad [1]$$

wherein
$MFR_1$: MFR of polymer produced in the first polymerizer
$MFR_t$: MFR of polymer produced in the terminal polymerizer (3) The continuous process as described in (1) above wherein the gas withdrawn from the gaseous phase of at least one of the second and subsequent polymerizers is recycled in the first polymerizer, together with the gas recovered from a degasification tank.

(4) The continuous process as described in (1) above wherein a small quantity of ethylene and/or an α-olefin are/is supplied to in at least one of the polymerizers, together with propylene.

(5) In a process for continuously producing an ethylene-propylene copolymer using a Ziergler-Natta catalyst, the continuous process for producing a high molten viscoelastic ethylene-propylene copolymer which comprises:
  a. using at least 3 polymerizers connected in series, firstly supplying monomers having a weight ratio of ethylene to ethylene and propylene of 0 to 5 wt% in the monomers to be supplied in at least two polymerizers including first and second polymerizers to perform continuous polymerization step (i) of propylene as the major component, and then supplying monomers having a weight ratio of ethylene to ethylene and propylene of 10 to 100 wt% in the monomers to be supplied in at least one polymerizer which was not used in said step (i) to perform continuous polymerization step (ii) containing ethylene in a relatively larger amount than in the former step;
  b. supplying the whole amount of the catalyst to be used in the first tank, the catalyst supplied being passed through the second and subsequent tanks in order together with the polymerization reaction mixture to addition-form a polymer polymeri-zed in each polymerizer on the same catalyst solid and then discharged from the terminal tank; and,
  c. using hydrogen gas as a molecular weight regulator in the continuous polymerization step (i) of propylene as the major component, supplying the hydrogen gas by the whole amount in the first tank and transferring the balance of the hydrogen gas consumed in each preceding tank to the second and subsequent tanks, together with the polymerization reaction mixture (slurry);
  d. performing continuous degasification from a gaseous phase of the second and subsequent polymerizers in the continuous polymerization step (i) of propylene as the major component, an amount to be degasified being 0.5 to 10 $V_1$/hr calculated as 0° C., 0 kg/cm²G when a volume of the polymerizer is $V_1$; and,
  e. an amount to be polymerized in the polymerization step (i) being 60 to 95 wt% based on the total polymerization amount.

(6) The continuous process as described in (5) above wherein a ratio of MFR value of each polymer produced in the first polymerizer and the terminal polymerizer in at least two polymerizers connected in series is adjusted to be in a range of equation [2] below:

$$\log \frac{MFR_i}{MFR_t} \geq 2.0 \qquad [2]$$

wherein
$MFR_i$: MFR of polymer produced in the i order of polymerizer
$MFR_t$: MFR of polymer produced in the terminal polymerizer in the continuous polymerization step (i) of propylene as the major component (7) The continuous process as described in (5) above wherein the gas withdrawn from the gaseous phase of at least one of the second and subsequent polymerizers is recycled in the first polymerizer, together with the gas recovered from a degasificatio tank.

(8) The continuous process as described in (5) above wherein the continuous polymerization step (i) is performed in the presence of an inert solvent or liquid propylene using a compound represented by general formula:

$$AlR_m'X_{3-m}$$

(wherein $R'$ represents a hydrocarbon group having 1 to 20 carbon atoms; X represents a halogen atom; and m indicates the number of $3 \geq m > 1.5$) as an organic aluminum compound (B) in combination with a titanium-containing solid component (A) constituting the Ziegler-Natta catalyst and a glycol ether (C) is continuously added to the slurry after completion of step (i) in a concentration of:

(C)/Ti in (A) =0.01 to 1.0 (mol/atom)

based on the titanium component in (A) to perform the continuous polymerization step (ii).

BRIEF DESCRIPTION OF THE DRAWINGS

In the figure:
1: first polymerizer (200 l)
2: second polymerizer (200 l)
3: degasification tank (100 l)
4: pump
5: heat exchanger
6: compressor

Figure 1:
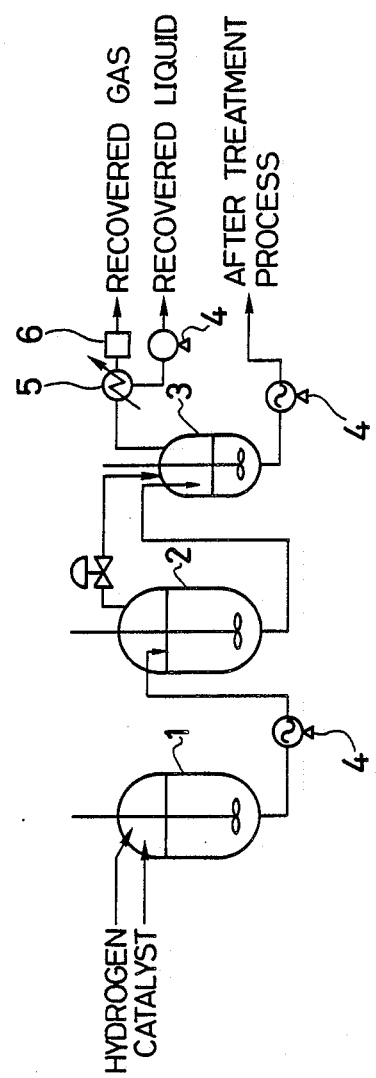
FIG. 1 is a flow sheet of a polymerization device used in Examples 1 to 6 of the present invention and Comparative Examples 1 to 4.

In the figure:
1 : polymerizer (1)
2 : polymerizer (2)
3 : degasification tank (1)
4 : polymerizer (3)
5 : degasification tank (2)
6 : pump
7 : control valve

PREFERRED EMOBDIMENTS OF THE INVENTION

The constructions and effects of the present invention will be described below in detail.

As the catalyst used in the present invention, a so called Ziegler-Natta catalyst may be sufficient but there is no particular limitation. Preferably, catalysts basically composed of titanium compounds and organic aluminum compounds in combination are used.

As the titanium compound, there can be advantageously used catalysts generally used for stereoregular polymerization of propylene such as a titanium trichloride composition obtained by reducing titanium tetrachloride with hydrogen or metallic aluminum, etc.; a composition obtained by further grinding the titanium trichloride composition with a ball mill, an oscillating mill, etc. thereby to activate the titanium trichloride composition; a composition obtained by further treating the activated composition with an electron donor; a titanium trichloride composition obtained by reducing titanium tetrachloride with an organic aluminum compound followed by various treatments (for example, a titanium trichloride composition obtained by crystal transition with heating in titanium tetrachloride, highly activated titanium trichloride by treating with an electron donating compound or an electron accepting compound, etc.): a so called carrier type catalyst obtained by carrying titanium tetrachloride on a carrier such as magnegium chloride, etc.

As the organic aluminum compound, compounds represented by general formula: $AlR_nR'_{n'}X_3 - (n + n')$ can be preferably used. In the formula, R and R' each represents a hydrocarbon group such as an alkyl group, an aryl group, etc.; X represents a halogen such as fluorine, chloride, bromine and iodine; and, n and n' each represents an optional number shown by: $0 < n + n' \leq 3$. Specific examples are a trialkyl aluminum or a dialkyl aluminum monohalide, which can be used singly or as admixture of two or more. Further electron donors ordinarily used as a third component of a catalyst can also be used in combination with the titanium compound and organic aluminum compound described above.

As a mode of polymerization, slurry polymerization using as a solvent a hydrocarbon such as propane, hexane, heptane, octane, benzene, toluene, etc. or bulk polymerization using propylene as a solvent can be used.

As the polymerizers used in the first process of the present invention, two or more tanks are preferably connected in series. For transfer of the reaction mixture, a part of the liquid phase (slurry) in the polymerizer at the former stage is transferred to a polymerizer in a subsequent stage. The two or more polymerizers must be connected in series. Also in the second process of the present invention, as the polymerizers, tanks are preferably used. In the polymerization step (i) using propylene as the main component, two or more polymerizers are connected in series, in which the transfer of the polymerization reaction mixture (slurry) is performed by continuously withdrawing a part of the slurry (liquid phase) and continuously transferring it to a subsequent polymerizer, In the polymerization step (ii) containing ethylene in a relatively large amount, the step (ii) includes a first tank which continuously receives the polymerization reaction mixture from the terminal polymerizer in the first step. Preferably, using one or more polymerizers of tank type, ethylene and propylene are supplied in a definite ratio to perform continuous polymerization.

In the processes of the present invention, the catalyst to be used is supplied only in the first tank polymerizer throughout the whole steps described above. Thus, the solid catalyst supplied is passed in order through polymerizers such as the second to third tanks, etc. together with the other polymerization reaction mixture, during which the catalyst is withdrawn from the terminal polymerizer in such a state that the solid particles are covered by the polymer formed in each polymerizer thereon.

If a catalyst is freshly supplied in the second and subsequent tanks, polymers having greatly different MFR from the polymer produced in the first tank are produced on the solid particles of the catalyst so that it is difficult to uniformly mix these polymers with each other, even though a graining step after collection of the products; molded articles obtained from these products cause poor appearance of the articles such as fish eye, etc. and such is not preferred.

In the processes of the present invention, hydrogen is used as the molecular weight regulator. The hydrogen is supplied only in the first tank polymerizer throughout the whole steps described above, like the catalyst described above. The supply to the first tank may be performed in any of the gaseous phase and the liquid phase in the tank.

However, the supply of hydrogen to the second and subsequent tanks from each preceding tank is made in the form of dissolving hydrogen in the polymerization reaction mixture described above, i.e., in a solution state. Accordingly, in the case of supplying hydrogen in the liquid phase (polymerization reaction mixture) of the first tank, care should be taken that undissolved hydrogen which is in a foam state not be transferred to the second tank. If the hydrogen that is incorporated in the liquid phase in the foam state is transferred to a next tank (there is some possibility in the second and subsequent tanks, depending upon state of stirring), a degasified amount becomes larger upon degasification in the second and subsequent tanks than in the case that no foam of hydrogen is present and thus, an efficiency of withdrawal decreases.

Further in the first process of the present invention, two or more polymerizers connected in series are used as the polymerizers. Unlike the supply of catalyst and hydrogen described above, propylene and a small quantity of ethylene or α-olefin or solvent can be supplied in the polymerizer in each stage by each definite amount. The small quantity of ethylene or α-olefin can be supplied in at least one of the polymerizers in a weight ratio of 30 wt% or less, preferably 10 wt% or less, more preferably 5 wt% or less, based on propylene, independently or as admixture with propylene. The α-olefin is not limited but mention may be made of butene-1, 2-methylbutene-1, 4-methyl-pentene-1,etc. In the second and subsequent polymerizers, the amount of ga to be withdrawn from the gaseous phase of the polymerizers is preferably performed in a range of 0.5 to 10 $V_1$ per an hour calculated as NTP, namely 0° C. and 0 $kg/cm^2G$, when the volume of the polymerizer is made $V_1$, When the amount of gas withdrawn is less than 0.5 $V_1$, the effect of increasing the molecular weight of the produced polymer is insufficient; conversely when in the case of exceeding 10 $V_1$, a difference in molecular weight becomes excessively greater than that of the polymer produced in the polymerizer immediately before and fluidity of resin upon formation becomes non-uniform and, there is a danger of causing poor formability, surface roughness, etc., which are not preferred. Further when log $MFR_1/MFR_t$ is less than 2, broadening of the molecular weight distribution which is the basic object of the first process of the present invention is insufficient.

As described above, the polymerization reaction mixture is sequentially transferred from the first polymerizer to the terminal polymerizer. The polymerization reaction mixture, namely, slurry, withdrawn from the terminal polymerizer is transferred to a pressure drop tank for decreasing the pressure. The gas generated in the pressure drop tank contains large quantities of propylene so that the gas is generally compressed, recycled to the polymerizers and re-used. Further the gas withdrawn from the gaseous phases in the second and subsequent polymerizers are recycled and re-used, together with the gas generated in the pressure drop tank described above. Thus, the process can be performed without loss of raw materials.

In the first process of the present invention, a polymerization temperature is not limited but the process can easily be conducted generally in a range of 20 to 100° C., preferably 40 to 80° C. The temperature in each polymerizer may be the same or different.

In the first process of the present invention, a polymerization pressure is not limited but is generally under normal pressure to 50 $kg/cm^2G$. The polymerization pressure of each polymerizer in accordance with the process of the present invention which is connected in series may be the same as or different from one another.

In the first process of the present invention, a mean residence time of the reaction mixture in each polymerizer connected in series is not limited but the process is carried out generally for 30 minutes to 10 hours.

Furthermore, for transfer of the slurry between the polymerizers connected in series, conventionally used transportation through a pump, transportation utilizing a pressure difference and other methods can be adopted but there is no particular restriction.

The MFR of polypropylene thus obtained in accordance with the first process of the present invention is generally 0.01 to 100, For sheet molding and blow molding, polypropylene having the MFR value of 0.05 to 10, preferably 0.10 to 5.0 is used.

In the second process of the present invention, an amount of gas to be withdrawn from the gaseous phase of the polymerizers is preferably performed in a range of 0.5 to 10 $V_1$ per an hour calculated as 0° C and 0 $kg/cm^2G$, when the volume of the polymerizer is made $V_1$. It is preferred to continuously withdraw the gas through a control valve so as to keep the hydrogen concentration at the aimed concentration, while measuring the hydrogen concentration in the gaseous phase by process gas chromatography, etc. By the degree of this hydrogen withdrawal, MFR of the polymer produced in the tank can be reduced to a preferred degree, as compared to the case no gas is withdrawn. The whole amount or a part of the withdrawn gas can be recycled to the first tank.

In the second process of the present invention, propylene, ethylene and the solvent may be supplied to each polymerizer, depending upon necessity. The solvent is replenished to properly maintain the slurry concentration in each polymerizer depending upon the amount of polymer increased. By performing the polymerization step (i) of the present invention, the molecular weight of polymer produced in each tank stepwise increases from the first to second tanks and the second to third tanks, whereby a sufficient difference in molecular weight can be given as a whole.

In the second process of the present invention, a polymerization pressure in the polymerization step (i) using propylene as the major component is not limited but is generally under normal pressure to 50 $kg/cm^2G$. The polymerization pressure of each polymerizer in accordance with the process of the present invention which is connected in series may be the same as or different from one another.

In the second process of the present invention, a polymerization temperature in the continuous polymerization step (i) performed using propylene as the major component is not limited but is generally in a range of 20 to 100° C., preferably 40 to 80° C.

In the second process of the present invention, a mean residence time of the reaction mixture in each polymerizer connected in series is not limited but the process is carried out generally for 30 minutes to 10 hours. Further the aforesaid various polymerization conditions, namely, pressure, temperature, residence time, etc. can be chosen depending upon quality of the objective polypropylene, catalyst used, or the like, whereby the objects of the second process of the present invention can easily be achieved. Furthermore, for transfer of the slurry between the polymerizers connected in series, conventionally used transportation through a pump, transportation utilizing a pressure difference and other methods can be adopted but there is no particular restriction.

The MFR of polypropylene thus obtained via the polymerization step (ii) at a later stage of the second process in accordance the present invention is generally 0.01 to 100, For sheet molding and blow molding, polypropylene having the MFR value of 0.05 to 10, preferably 0.10 to 5.0 is used.

For reference, it is preferred that the molecular weight difference among polypropylene produced in the respective polymerizers of polymerization step (i) connected in series be in a range of equation [2]described below, when expressed as a MFR value:

$$\log \frac{MFR_i}{MFR_t} \geq 2.0 \quad [2]$$

wherein
$MFR_i$: MFR of polymer produced in the i order of polymerizer
$MFR_t$: MFR of polymer produced in the terminal polymerizer in the continuous polymerization step (i) of propylene as the major component
When the numerical value in the left side is less than 2.0, high melting viscoelasticity of the objective polymer in the second process of the present invention tends to be insufficient and such is not preferred.

The monomer composition to be supplied in the polymerization step (i) in the second process of the present invention is:

$$\frac{\text{ethylene} (C_2^=)}{\text{ethylene} (C_2^=) + \text{propylene} (C_3^=)} = 0 \text{ to } 5 \text{ wt \%}$$

When the amount of ethylene used exceeds 5 wt%, a tendency of lowering physical properties such as rigidity, heat resistance, etc. characteristic of polypropylene is noted with respect to the finally obtained copolymer and such is not preferred. In addition, 1-butene, 4-methylpentene-1, styrene or non-conjugated dienes, etc. may be added to the monomers as a third component in 0 to 10 wt% based on propylene.

The ratio of polymerization in the polymerization step (i) of the second process of the present invention is 60 to 95 wt%, preferably 75 to 90 wt%, based on the ethylene-propylene copolymer which is the product finally obtained. Polymerization in the polymerization step (i) which exceeds the upper limit described above results in reduced rigidity of the block copolymer product; when the polymerization degree is less than the lower limit described above, improvement in impact strength of the polymer at low temperatures is insufficient. The polymerization degree can be chosen in the range described above depending upon the desired quality.

The slurry flown out after completion of the polymerization step (i) in the second process of the present invention is continuously transferred to the first polymerizer in the polymerization step (ii), whereby the polymerization step (ii) containing ethylene in relative large quantities is performed.

In the polymerization step (ii), ethylene is used at minimum twice (10 wt%) the amount, as compared to the polymerization step (i). In the polymerization step (ii), it is not necessarily required to use two or more polymerizers. In case that the amount of polymerization in the step (ii) is as relatively large as, for example, 20 to 40 wt%, however, the amount of the polymer produced in each polymerizer can be balanced by the use of two or more polymerizers.

Further in the polymerization step (ii), the ethylene concentration in the monomers supplied differs more greatly than in the step (i). Therefore, once the slurry discharged from the polymerization step (i) is received in the pressure drop tank and subjected to degasification (note: the propylene, ethylene and hydrogen dissolved are removed), the slurry can also be supplied to the polymerizers in the polymerization step (ii). The polymerization step (ii) is carried out in a manner similar to the polymerization in the polymerization step (i) except for supplying the monomers in a definite weight ratio of ethylene/ethylene +propylene, a necessary amount of hydrogen and solvent.

According to a preferred embodiment of the second process of the present invention, a specific glycol ether (hereafter sometimes referred to as additive C) is added as the third catalyst component in the polymerization step (ii). The purpose of adding the additive lies directly in reducing the activity of the catalyst to be added to a considerable extend but substantially in selectively inactivating a short path catalyst (catalyst having a high activity) to homogenize the polymer produced in the second step.

As the glycol ether, mention may be made of an ethylene glycol monoalkyl ether, an ethylene glycol dialkyl ether, a propylene glycol monoalkyl ether and a propylene glycol dialkyl ether. Specific examples are ethylene glycol monomethyl ether, ethylene glycol dimethyl ether, ethylene glycol monoethyl ether, ethylene glycol diethyl ether, ethylene glycol monopropyl ether, ethylene glycol dipropyl ether, ethylene glycol monobutyl ether, ethylene glycol dibutyl ether, propylene glycol monomethyl ether, propylene glycol dimethyl ether, propylene glycol monoethyl ether, propylene glycol diethyl ether, propylene glycol monopropyl ether, propylene glycol dipropyl ether, propylene glycol monobutyl ether, propylene glycol dibutyl ether; further as condensation products of glycol, a diethylene glycol monoalkyl ether, a diethylene glycol dialkyl ether, a triethylene glycol monoalkyl ether, a triethylene glycol dialkyl ether, tetraethylene glycol monoalkyl ether, a tetraethylene glycol dialkyl ether, a dipropylene glycol monoalkyl ether, a dipropylene glycol dialkyl ether, a tripropylene glycol monoalkyl ether, a tripropylene glycol dialkyl ether, tetrapropylene glycol monoalkyl ether, a tetrapropylene glycol dialkyl ether, a polyethylene glycol monoalkyl ether, a polyethylene glycol dialkyl ether, a polypropylene glycol monoalkyl ether, a polypropylene glycol dialkyl ether, etc. As the alkyl group, mention may be a hydrocarbon chain having 1 to 20 carbon atoms. In addition, glycol ethers obtained by reacting ethylene oxide and propylene oxide may also be used. These ethers (C) are used in a molar ratio in (C)/Ti in (A) =0.01 to 1.0, based on titanium in the titanium-containing catalyst component (A). It is also preferred to incorporate (C) in a range of 30 to 80%, based on the catalytic activity being made 100% in the case of incorporating no glycol ether, while the effect is different depending upon kind of the glycol ether. When the addition amount is too much, the effect of inactivating the short path catalyst is great but reduction of the total catalytic activity is also great; such is not preferred from an economical viewpoint and control in a ratio of polymerization (i) to polymerization (ii) is limited which is also not preferred. Conversely when (C) is too less, the aforesaid effect of selectively inactivating the short path catalyst is insufficient and such is not preferred.

The reason why the glycol ethers used in the second process of the present invention is remarkably excellent as compared to ketones, amines, amides, alkyl ethers, carboxylic acid esters or halogen compounds conventionally known is unclear but it is assumed that the glycol ethers would react with the organic aluminum compounds (B) to form complexes insoluble in inert solvents and the complexes might react with the catalyst inside th polymer particles only with difficulty so that the action of predominantly inactivating the short path catalyst would be markedly exhibited. Namely, it is also assumed that necessary conditions would be the formation of liquid complexes insoluble in inert solvents and that the complexes possess a viscosity difficult to easily permeate into the inside of the polymer particles.

The addition of the aforesaid glycol ether in the polymerization step (ii) is performed to the slurry withdrawn from the degasified step (i) described above prior to initiation of polymerization in the polymerization step (ii). The glycol ether may also incorporated directly in the polymerizers. The mode of adding the glycol ether may be continuous or intermittent; in the case of the latter, however, an interval of the addition is within ⅓ the residence time of the slurry in the polymerizers of the polymerization step (ii). When the interval is long, the effect of adding the additive C becomes insufficient.

General polymerization conditions for the polymerization step (ii) in the second process of the present invention are as follows. That is, a polymerization temperature is between 20 and 80° C, preferably between 40 and 70° C; a pressure is 0 to 50 kg/cm²G and a mean residence time is 20 minutes to 10 hours.

In order to control the molecular weight, hydrogen is generally used; its amount to be used is 1 to 40 mol% as a concentration in the gaseous phase in the polymerizers.

A ratio of the monomers used is 10 to 100 wt%, preferably 20 to 70 wt%, in a weight ratio of ethylene to ethylene +propylene. An amount of polymerization is 5 to 40 wt%, preferably 10 to 25 wt%, based on the finally obtained ethylene-propylene copolymer. Further in the polymerization step (ii), small quantities of other α-olefins or non-conjugated dienes may also be used in combination, as in the polymerization step (i).

Major effects of the first and second processes in the present invention described above in detail can be summarized as follows.

Firstly, the ethylene-propylene copolymer in accordance with the second process of the present invention has a broader molecular weight distribution than in conventional copolymers so that the fluidity is good upon extrusion molding and as a result, an amount extruded through an extruder can be increased and consumption power can be saved, etc. Likewise, the ethylene-propylene copolymer has characteristics such as excellent fluidity upon injection molding, etc. and therefore, excellent results can be obtained in quality and finishing efficiency of molded articles obtained for use in a variety of molding fields.

Secondly, in the processes of the present invention, there is allowance in conditions for operation of each polymerizer as a definite multiple polymerization and therefore, control in the polymerization processes and control in polymerization conditions can be extremely easily done.

Particularly in the first process of the present invention, polypropylene having a broad molecular weight distribution contemplated in the present invention can be obtained by supplying the catalyst only in the first polymerizer of two or more polymerization tanks connected in series and compound withdrawing gas from the gaseous phase of the second and subsequen polymerizers, without providing any particular degasification tank in the intermediate stage and a slurry transfer pump, a gas recovery device, etc. accompanied thereby.

As described above, the present invention can achieve the effects described above which were impossible to achieve in the prior art, by adopting the particular polymerization conditions and by the use of the particular additive (in preferred embodiments).

The present invention will be described in more detail with reference to the examples below but is not deemed to be limited thereto.

Analyse and measurement in the examples were performed as described below.

(1) MFR (g/10 minutes) : ASTM D-1238, 230° C, 2.16 kg load (2) Ethylene content (wt%) : infrared absorption spectrum method (3) Polymerization ratio (wt/wt) of polymerization (i) to polymerization (ii) :

Copolymers having various reaction ratios of ethylene/propylene were previously prepared. Using the copolymers as standard samples, a calibration curve was prepared by the infrared absorption spectrum method. A ratio of ethylene/propylene reacted in polymerization (ii) was determined and the polymerization ratio was calculated from the ethylene content (described above) of the whole copolymers.

(4) Calculation MFR of polymer produced in each polymerizer :

$MFR_1$: MFR of the polymer polymerized in the first polymerizer (*1)

$MFR_2$: MFR of the polymer polymerized in the second polymerizer (*1)

$MFR_{1+2}$: MFR of the total polymers polymerized in the first and second polymerizers $W_1$: ratio of the total polymers produced in polymerizer in the polymerization step (i) (*2)

$W_2$: ratio of the total polymers produced in the second polymerizer in the polymerization step (i) (*2)

$W_1 + W_2$: 1.0

*1: Sampling was performed followed by actual measurement.

*2: The titanium content in the polymers was analyzed and calculated by the X ray fluorometry.

$MFR_2$ was determined by the following relationship:

$$\log MFR_{1+2} = \frac{W_1}{W_1 + W_2} \log MFR_1 + \frac{W_2}{W_1 + W_2} \log MFR_2$$

(5) Measurement of physical properties of articles sheet molded:
Young's modulus (kgf/mm$^2$) : ASTMD—882
Blanking impact strength (kgf/mm$^2$) : ASTMD—781
Heating behavior : CHISSO's method (described below)

In order to evaluate heating vacuum properties of a sheet as a model, the sheet was fixed in a frame of 40 cm x 40 cm, which was put in a thermostat at 200° C. to measure the following physical properties. Namely, (a) a sagging amount (mm) at the initial stage of heating of the sheet, (b) the maximum spring back amount (%) : [1/150 x (150 - maximum sagging amount (mm) when recovered x 100)] and (c) residence time (second) from the maximum recovery to re-sagging.

(6) Appearance of sheet : visual observation

EXAMPLE 1

(1) Preparation of catalyst

Six liters of n-hexane, 5.0 mols of diethyl aluminum monochloride (DEAC) and 12.0 mols of diisoamyl ether were mixed at 25° C. for 5 minutes. The mixture was reacted at the same temperature for 5 minutes to give reaction solution (I) (molar ratio of diisoamyl ether/DEAC, 2.4). In a reactor substituted with nitrogen were charged 40 mols of titanium tetrachloride followed by heating to 35° C. The whole amount of the reaction solution (I) described above was dropwise added thereto over 180 minutes. Then, the mixture was kept at the same temperature for 30 minutes. After elevating the temperature to 75° C, the mixture was reacted for further an hour. After cooling to room temperature, the supernatant was removed and 30 liters of n-hexane were added followed by decantation. The operation was repeated 4 times to give 1.9 g of solid product (II).

The whole amount of this (II) was suspended in 30 liters of n-hexane. In this state, 1.6 kg of diisoamyl ether was added to the suspension at 20° C. and 3.5 kg of titanium tetrachloride at room temperature in about 5 minutes. The mixture was reacted at 65° C. for an hour. After completion of the reaction, the mixture was cooled to room temperature (20° C). After the supernatant was removed by decantation, 30 liters of n-hexane were added and the mixture was stirred for 15 minutes and settled and then the supernatant was removed. After this operation was repeated 5 times, the system was dried under reduced pressure to give solid product (III).

(2) Preparation of catalyst

In a tank having an inner volume of 50 liters were charged 40 liters of n-hexane, 850 g of diethyl aluminum chloride, 360 g of the solid product described above and 3.8 g of methyl p-toluate. Next, while keeping at 30° C. and stirring, propylene gas was supplied in 180 g/H for 2 hours to conduct a preliminary treatment.

(3) Polymerization

Polymerization was conducted in a polymerization device shown in FIG. 1.

In polymerizer (1) were continuously supplied 28l/H of n-hexane and 120 ml/H of a catalyst slurry. Propylene gas supplied and controlled in each polymerizer to show temperature of 70° C. and pressure of 6kg/cm$^2$G and of 8kg/cm$^2$G in polymerizers (1) and (2), respectively.

Further 530Nl/H of gas was continuously discharged from polymerizer (2). The solution was withdrawn through a control valve so as to show 80% of solution level in each polymerizer. Gas from a degasification tank was compressed by a compressor and recycled to polymerizer (1). The polymer produced was 5kg/H.

Analytical data are shown in Table 1.

(4) Graining and sheet molding

To 15kg of the white polymer powders obtained above were added 15g of BHT ® (2,6-di-t-butyl-p-cresol), 7.5g of Irganox 1010 (tetrakis[methylene(3,5-di-t-butyl-4-hydrocinnamate)] -methane) and 30g of calcium stearate. The mixture was subjected to graining using a granulator of 40 mm$\phi$. Then, the granulated matters were finished with an extrusion molding machine of 50 mm$\phi$ at 225° C. to prepare a sheet having a width of 60cm and a thickness of 0.4mm. Physical properties of the sheet were evaluated by the methods described above. The results are shown in Table 2.

COMPARATIVE EXAMLE 1

The procedures of Example 1 were carried out in a similar manner except that the gas in the gaseous phase was not discharged from polymerizer (2). The sheet was inferior in heating behavior.

COMPARATIVE EXAMPLE 2

The procedures of Example 1 were carried out in a similar manner except that a hydrogen concentration in the gaseous phase of the polymerizers was made identical by supplying hydrogen to various polymerizers. In this case, the sheet was markedly inferior in heating behavior.

EXAMPLES 2 THROUGH 4 AND COMPARATIVE EXAMPLES 3 AND 4

The procedures of Example 1 were carried out in a similar manner except that the gaseous phase hydrogen concentration and the amount of gas discharged were changed as shown in the table.

EXAMPLE 5

The procedures of Example 1 were carried out in a similar manner except that the polymerization temperature and the gaseous phase hydrogen concentration were changed as shown in the table. Further ethylene gas was continuously supplied in polymerizers (1) and (2), respectively, in 60 g/H. The ethylene content in the polymer obtained was 2.5%.

EXAMPLE 6

In Example 1, methyl p-toluate was supplied to polymerizer (1) in 1 g per 1 g of the solid product in the catalyst slurry. Further the amount of the catalyst slurry was changed to 240 ml/H. As shown in the table, the results reveral that Young's modulus was remarkably increased and heating behavior was improved with the catalyst system of the present invention.

TABLE 1

| | | Example 1 | Comparative Example 1 | → 2 | → 3 | Example 2 | Comparative Example 4 | Example 3 | → 4 | → 5 | → 6 |
|---|---|---|---|---|---|---|---|---|---|---|---|
| Polymerizer (1) | | | | | | | | | | | |
| Temperature | °C. | 70 | 70 | 70 | 70 | 70 | 70 | 70 | 70 | 60 | 70 |
| Pressure | kg/cm²G | 6 | 6 | 6 | 6 | 6 | 6 | 6 | 6 | 6 | 6 |
| Gaseous phase $H_2$ concentration | mol % | 2.3 | 1.2 | 0.40 | 1.5 | 1.8 | 8.5 | 3.8 | 7.5 | 7.0 | 7.6 |
| $MFR_1$ | g/10 mins. | 7.5 | 2.2 | 0.45 | 3.2 | 5.0 | 84 | 15.3 | 42.4 | 21.6 | 10.8 |
| Polymerization ratio | wt % | 55 | 54 | 52 | 52 | 51 | 55 | 50 | 52 | 48 | 53 |
| Polymerizer (2) | | | | | | | | | | | |
| Temperature | °C. | 70 | 70 | 70 | 70 | 70 | 70 | 70 | 70 | 60 | 70 |
| Pressure | kg/cm² | 8 | 8 | 8 | 8 | 8 | 8 | 8 | 8 | 8 | 8 |
| Gaseous phase $H_2$ concentration | mol % | 0.06 | 0.13 | 0.40 | 0.10 | 0.07 | 0.01 | 0.05 | 0.03 | 0.08 | 0.09 |
| $MFR_2$ | g/10 mins. | 0.021 | 0.11 | 0.45 | 0.06 | 0.04 | 0.000 | 0.01 | 0.007 | 0.009 | 0.01 |
| Polymerization ratio | wt % | 45 | 46 | 48 | 48 | 49 | 48 | 50 | 48 | 52 | 47 |
| Amount of gaseous phase gas discharged | Nl/Hr | 530 | 0 | 0 | 70 | 150 | 2500 | 900 | 1900 | 1240 | 530 |
| $MFR_{1+2}$ | | 0.52 | 0.55 | 0.45 | 0.47 | 0.47 | 0.37 | 0.48 | 0.67 | 0.38 | 0.47 |
| $\log \dfrac{MFR^1}{MFR^2}$ | | 2.6 | 1.3 | 0 | 1.7 | 2.1 | 5.0 | 3.0 | 4.0 | 3.4 | 2.9 |

TABLE 2

| | | Example 1 | Comparative Example 1 | → 2 | → 3 | Example 2 | Comparative Example 4 | Example 3 | → 4 | → 5 | → 6 |
|---|---|---|---|---|---|---|---|---|---|---|---|
| MFR (pellet) | g/10 | 0.48 | 0.51 | 0.44 | 0.44 | 0.43 | 0.37 | 0.45 | 0.58 | 0.40 | 0.42 |
| Thickness of sheet | μ | 410 | 403 | 412 | 397 | 396 | 412 | 398 | 406 | 401 | 405 |
| Young's modulus | kgf/mm² | 103 | 104 | 103 | 103 | 104 | 103 | 102 | 104 | 83 | 137 |
| Heating behavior: | | | | | | | | | | | |
| Sagging amount | mm | 23 | 30 | 33 | 28 | 25 | 20 | 21 | 20 | 20 | 21 |
| Maximum recovery | % | 98 | 85 | 80 | 90 | 95 | 100 | 100 | 100 | 100 | 100 |
| Residence time | second | 23 | 14 | 10 | 16 | 20 | 34 | 26 | 28 | 26 | 30 |
| Sheet appearance visual observation | | good | good | good | good | good | bad | good | good | good | good |

EXAMPLE 7

(1) Preparation of catalyst

Six liters of n-hexane, 5.0 mols of diethyl aluminum monochloride (DEAC) and 12.0 mols of diisoamyl ether were mixed at 25° C. for 5 minutes. The mixture was reacted at the same temperature for 5 minutes to give reaction solution (I) (molar ratio of diisoamyl ether/DEAC, 2.4). In a reactor substituted with nitrogen were charged 40 mols of titanium tetrachloride followed by heating to 35° C. The whole amount of the reaction solution (I) described above was dropwise added thereto over 180 minutes. Then, the mixture was kept at the same temperature for 30 minutes. After elevating the temperature to 75° C., the mixture was reacted for further an hour. After cooling to room temperature, the supernatant was removed and 30 liters of n-hexane were added followed by decantation. The operation was repeated 4 times to given 1.6 kg of solid product (II).

The whole amount of this (II) was suspended in 30 liters of n-hexane. In this state, 1.6 kg of diisoamyl ether was added to the suspension at 20° C. and 3.5 kg of titanium tetrachloride at room temperature in about 5 minutes. The mixture was reacted at 65° C. for an hour. After completion of the reaction, the mixture was cooled to room temperature (20° C.). After the supernatant was removed by decantation, 30 liters of n-hexane were added and the mixture was stirred for 15 minutes and settled and then the supernatant was removed. After this operation was repeated 5 times, the system was dried under reduced pressure to give solid product (III).

(2) Preparation of catalyst

In a tank having an inner volume of 50 liters were charged 40 liters of n-hexane, 850 g of diethyl aluminum chloride, 360 g of the solid product described above and 3.8 g of methyl p-toluate. Next, while keeping at 30° C. and stirring, propylene gas was supplied in 180 g/H for 2 hours to conduct a preliminary treatment.

(3) Polymerization

Figure 2:
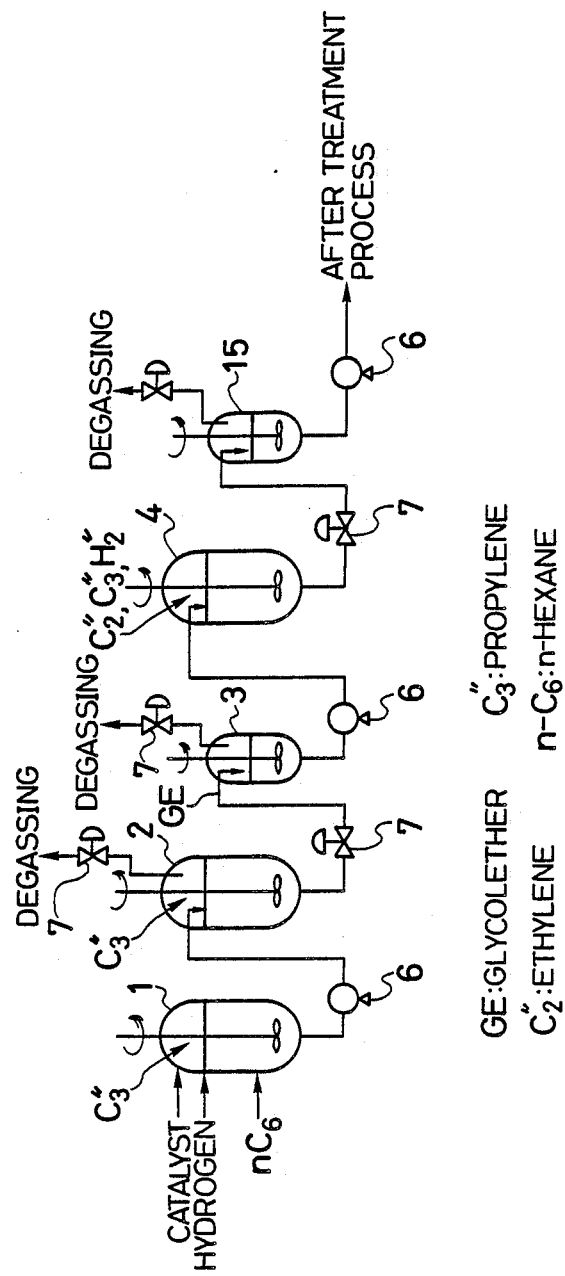
FIG. 2 is a flow sheet of a polymerization device used in Examples 7 to 12 of the present invention and Comparative Examples 5 to 10.

Polymerization was conducted in a polymerization device shown in FIG. 2.

In polymerizer (1) were continuously supplied 26 l/H of n-hexane and 120 ml/H of a catalyst slurry. Propylene was supplied and controlled in each polymerizer to show temperature of 70° C. and pressure of 8 kg/cm²G in polymerizers (1) and (2), respectively.

Further 500 Nl/H of gas was continuously discharged from polymerizer (2). The solution was withdrawn through a control valve so as to show 80% of solution level in each polymerizer. Gas from a degasification tank was compressed by a compressor and recycled to polymerizer (1). Amounts reacted in each polymerizer and analytical data of MFR are shown in Table 3.

The slurry containing the polymer particles withdrawn from polymerizer (2) was degasified in a degasification tank (3) at 60° and 0.5 kg/cm²G which was transferred to polymerizer (4) through pump 6. The gaseous phase hydrogen concentration was 10 mol% and the temperature was 60° C. in polymerizer (4). Ethylene was supplied in 500 g/H and, propylene and hydrogen were supplied so as to have a gaseous phase gas composition of ethylene/(ethylene +propylene) =0.40. The slurry discharged from polymerizer (4) was passed through degasification tank (15). After the catalyst was inactivated with methanol, the slurry was neutralized with an aqueous sodium hydroxide solution and washed with water. After separation and drying steps, about 5.5 kg/H of white copolymer powders were obtained. Analytical data are shown in Table 3.

(4) Graining and sheet molding

To 15 kg of the white polymer powders obtained above were added 15 g of BHT ® (2,6-di-t-butyl-p-cresol), 7.5 g of Irganox 1010 ® (tetrakis[methylene(3,5-di-t-butyl-4-hydrocinnamate)] methane) and 30 g of calcium stearate. The mixture was subjected to graining using a granulator of 40 mm$\phi$. Then, the granulated matters were finished with an extrusion molding machine of 50 mm$\phi$ at 225° C. to prepare a sheet having a width of 60 cm and a thickness of 0.4 mm Physical properties of the sheet were evaluated by the methods described above. The results are shown in Tables 5 and 6.

COMPARATIVE EXAMPLE 5

The procedures of Example 7 were carried out in a similar manner except that the gas in the gaseous phase was not discharged from polymerizer (2). The sheet made from polymer obtained was inferior in heating behavior.

COMPARATIVE EXAMPLE 6

The procedures of Example 7 were carried out in a similar manner except that he gaseous phase concentrations of polymerizers (1) and (2) were made identical by supplying together with hydrogen. Also in this case, the sheet was markedly inferior in heating behavior.

EXAMPLES 8 THROUGH 10 AND COMPARATIVE EXAMPLES 7 AND 8

The procedures of Example 7 were carried out in a similar manner except that the gaseous phase hydrogen concentration and the amount of gas discharged were changed as shown in Table 3. When the amount of gas discharged is insufficient, the sheet is inferior in heating behavior and when the amount is too much, appearance was not good upon molding of the sheet (due to non-uniform fluidity).

EXAMPLE 11

The procedures of Example 7 were carried out in a similar manner except that diethyleneglycol dimethyl ether (a) was added to the degasification tank (3) in a/Ti =0.3 (molar ratio) based on titanium in the solid catalyst and the gaseous phase hydrogen concentration in polymerizer (4) was made 2.0 mol%. Remarkable improvement was noted in low temperature blanking impact strength.

COMPARATIVE EXAMPLE 9

The procedures of Example 11 were carried out in a similar manner except that diethyleneglycol dimethyl ether was not added. Multiple occurrence of FE in sheet appearance and reduction in blanking impact strength were noted.

EXAMPLE 12

In Example 11, methyl p-toluate was supplied to polymerizer (1) in 1 g per 1 g of the solid product in the catalyst slurry. Further the procedures were performed, changing the amount of the catalyst slurry to 240 ml/H. As shown in the table, the results reveal that Young's modulus was remarkably increased and heating behavior was improved with the catalyst system of the present invention.

COMPARATIVE EXAMPLE 10

The procedures of Example 12 were carried out in a similar manner except that diethyleneglycol dimethyl ether was not added. Multiple occurrence of FE in sheet appearanc and reduction in blanking impact strength were noted.

TABLE 3

| | | Example 7 | Comparative Example 5 | → 6 | → 7 | Example 8 | Comparative Example 8 |
|---|---|---|---|---|---|---|---|
| Polymerizer (1) | | | | | | | |
| Temperature | °C. | 70 | 70 | 70 | 70 | 70 | 70 |
| Pressure | kg/cm² | 6 | 6 | 6 | 6 | 6 | 6 |
| Gaseous phase H₂ concentration | mol % | 2.5 | 1.5 | 0.45 | 1.9 | 2.2 | 10.0 |
| MFR₁ | g/10 mins. | 8.1 | 3.3 | 0.56 | 5.1 | 6.8 | 88 |
| Polymerization ratio | wt % | 45.5 | 44.3 | 43.8 | 44.7 | 44.2 | 45.0 |
| Polymerizer (2) | | | | | | | |
| Temperature | °C. | 70 | 70 | 70 | 70 | 70 | 70 |
| Pressure | kg/cm² | 8 | 8 | 8 | 8 | 8 | 8 |
| Gaseous phase H₂ concentration | mol % | 0.07 | 0.15 | 0.45 | 0.13 | 0.09 | 0.015 |
| MFR₂ | g/10 mins. | 0.035 | 0.090 | 0.60 | 0.08 | 0.042 | 0.002 |
| Polymerization ratio | wt % | 40.4 | 41.7 | 41.7 | 41.8 | 41.4 | 41.3 |
| MFR₁₊₂ | | 0.63 | 0.57 | 0.59 | 0.68 | 0.58 | 0.52 |
| $\log \frac{MFR^1}{MFR^2}$ | | 2.4 | 1.2 | 0 | 1.8 | 2.2 | 4.6 |

TABLE 3-continued

|  |  | Example 7 | Comparative Example 5 | → 6 | → 7 | Example 8 | Comparative Example 8 |
|---|---|---|---|---|---|---|---|
| Amount of gaseous phase gas discharged | Nl/Hr | 500 | 0 | 0 | 70 | 150 | 2500 |
| Polymerizer (3) | | | | | | | |
| Gaseous phase $H_2$ concentration | mol % | 10 | 10 | 10 | 10 | 10 | 10 |
| Ethylene content | wt % | 8.0 | 8.2 | 8.4 | 7.9 | 8.5 | 7.6 |
| Polymerization ratio | wt % | 14.1 | 14.0 | 14.5 | 13.5 | 14.4 | 13.7 |
| $MFR_3$ | g/10 mins. | 0.15 | 0.12 | 0.18 | 0.14 | 0.13 | 0.1 |

TABLE 4

|  |  | Example 9 | → 10 | → 11 | Comparative Example 9 | Example 12 | Comparative Example 10 |
|---|---|---|---|---|---|---|---|
| Polymerizer (1) | | | | | | | |
| Temperature | °C. | 70 | 70 | 70 | 70 | 70 | 70 |
| Pressure | kg/cm² | 6 | 6 | 6 | 6 | 6 | 6 |
| Gaseous phase $H_2$ concentration | mol % | 4.0 | 7.5 | 5.1 | 5.1 | 10.0 | 10.0 |
| $MFR_1$ | g/10 mins. | 17.5 | 41.5 | 23.9 | 25.3 | 28.7 | 29.5 |
| Polymerization ratio | wt % | 44.9 | 43.2 | 45.5 | 44.8 | 47.1 | 46.6 |
| Polymerizer (2) | | | | | | | |
| Temperature | °C. | 70 | 70 | 60 | 70 | 70 | 70 |
| Pressure | kg/cm² | 8 | 8 | 8 | 8 | 8 | 8 |
| Gaseous phase $H_2$ concentration | mol % | 0.06 | 0.03 | 0.08 | 0.08 | 0.15 | 0.15 |
| $MFR_2$ | g/10 mins. | 0.02 | 0.008 | 0.035 | 0.034 | 0.043 | 0.041 |
| Polymerization ratio | wt % | 41.4 | 42.7 | 40.6 | 41.1 | 39.1 | 39.8 |
| $MFR_{1+2}$ | | 0.68 | 0.59 | 1.1 | 1.1 | 1.5 | 1.4 |
| $\log \frac{MFR^1}{MFR^2}$ | | 2.9 | 3.7 | 2.8 | 2.9 | 2.8 | 2.9 |
| Amount of gaseous phase gas discharged | Nl/Hr | 900 | 1800 | 900 | 900 | 1000 | 1000 |
| Polymerizer (3) | | | | | | | |
| Gaseous phase $H_2$ concentration | mol % | 10 | 10 | 2.0 | 2.0 | 2.5 | 2.5 |
| Ethylene content | wt % | 7.7 | 8.3 | 8.0 | 8.2 | 8.1 | 7.8 |
| Polymerization ratio | wt % | 13.7 | 14.1 | 13.9 | 14.1 | 13.8 | 13.6 |
| $MFR_3$ | g/10 mins. | 0.12 | 0.16 | 0.002 | 0.002 | 0.002 | 0.002 |

TABLE 5

|  |  | Example 7 | Comparative Example 5 | → 6 | → 7 | Example 8 | Comparative Example 8 |
|---|---|---|---|---|---|---|---|
| MFR (pellet) | g/10 | 0.47 | 0.43 | 0.45 | 0.52 | 0.46 | 0.41 |
| Thickness of sheet | μ | 385 | 392 | 405 | 398 | 407 | 403 |
| Young's modulus | kgf/mm² | 96 | 94 | 94 | 95 | 94 | 96 |
| Heating behavior: | | | | | | | |
| Sagging amount | mm | 22 | 29 | 34 | 28 | 25 | 20 |
| Maximum recovery | % | 98 | 85 | 80 | 90 | 95 | 100 |
| Residence time (second) | | 24 | 14 | 11 | 16 | 20 | 32 |
| Sheet appearance visual observation | | good | good | good | good | good | bad |
| Blanking impact strength | kgf/mm² | | | | | | |
| 23° C. | | >30 | >30 | >30 | >30 | >30 | >30 |
| 0° C. | | >30 | >30 | >30 | >30 | >30 | >30 |
| −20° C. | | 19 | 15 | 17 | 14 | 24 | 12 |

TABLE 6

|  |  | Example | Comparative Example | → | → | Example | Comparative Example |
|---|---|---|---|---|---|---|---|
| MFR (pellet) | g/10 | 0.50 | 0.44 | 0.41 | 0.42 | 0.55 | 0.53 |
| Thickness of sheet | μ | 394 | 406 | 401 | 397 | 406 | 404 |
| Young's modulus | kgf/mm² | 95 | 96 | 94 | 95 | 122 | 121 |
| Heating behavior: | | | | | | | |
| Sagging amount | mm | 21 | 20 | 18 | 19 | 20 | 19 |
| Maximum recovery | % | 100 | 100 | 100 | 100 | 100 | 100 |
| Residence time (second) | | 30 | 32 | 35 | 34 | 31 | 32 |
| Sheet appearance visual observation | | good | good | good | bad | good | bad |

TABLE 6-continued

| | Example | Comparative Example | → | → | Example | Comparative Example |
|---|---|---|---|---|---|---|
| Blanking impact strength kgf/mm² | | | | | | |
| 23° C. | >30 | >30 | >30 | >30 | >30 | >30 |
| 0° C. | >30 | >30 | >30 | 27 | >30 | 24 |
| −20° C. | 16 | 21 | >30 | 10 | 20 | 7 |

While the invention has been described in detail and with reference to specific embodiments thereof, it will be apparent to one skilled in the art that various changes and modifications can be made therein without departing from the spirit and scope thereof.

What is claimed is:

1. A method for continuously producing molten viscoelastic polypropylene having a wide molecular weight distribution, which is suited for post-finishing sheets and blow molding, by the polymerization of propylene using a Ziegler-Natta catalyst, which process comprises the steps of:
   (1) providing at least two polymerizers in series followed by a degasification tank connected in series with the last in the series of said polymerizers,
   (2) supplying propylene and the whole amount of the catalyst used into the first in the series of polymerizers, said catalyst thereafter being continuously transferred into the second and any subsequent polymerizers in order, together with the reaction mixture;
   (3) supplying hydrogen as a molecular weight regulator, and introducing the whole amount of the hydrogen used into the first in the series of polymerizers, said hydrogen being continuously transferred into the second and any subsequent polymerizers in order, together with the reaction mixture,
   (4) producing polymerized polypropylene on the catalyst in each polymerizer in order and then continuously discharging the resulting reaction slurry from the last in the series of polymerizers; and
   (5) controlling the molecular weight of the distribution of the polymer produced in each polymerizer by withdrawing gas from the gaseous phase in either (a) any of the polymerizers after the first in the series of polymerizers or (b) in the degasification tanks, the amount of the gas withdrawn being within the range of 0.5 to 10 $V_1$/hr calculated as NTP when the volume of the polymerizer or degasification tanks in $V_1$.

2. The method as set forth in claim 1 wherein the ration of the MFR values of the respective polymers produced in the first in the series of polymerizers and the last in the series of polymerizers is adjusted to be in the range of equation $$\log \frac{MFR_1}{MFR_t} \geqq 2$$

wherein
   $MFR_1$ = MFR of polymer produced in the first polymerizer and
   $MFR_t$ = MFR of polymer produced in the terminal polymerizer.

3. The method set forth in claim 1 wherein a small quantity of at least one monomer selected from the group consisting of ethylene and propylene is also supplied into at least one of said polymerizers.

4. The method set forth in claim 1 wherein the gas withdrawn in step (5) is recycled to the first in said series of polymerizers.

5. the method set forth in claim 1 wherein there are only two polymerizers in series and only one gasification tank, and wherein propylene is the only olefin fed to said polymerizers.

* * * * *